(12) United States Patent
Fukatsu

(10) Patent No.: US 7,613,899 B2
(45) Date of Patent: Nov. 3, 2009

(54) RECONFIGURABLE DATA PROCESSING DEVICE AND METHOD

(75) Inventor: Tsutomu Fukatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 11/354,383

(22) Filed: Feb. 15, 2006

(65) Prior Publication Data

US 2006/0195684 A1    Aug. 31, 2006

(30) Foreign Application Priority Data

Feb. 25, 2005    (JP)    ............................. 2005-051370

(51) Int. Cl.
*G06F 15/76* (2006.01)
(52) U.S. Cl. ....................................................... 712/15
(58) Field of Classification Search .................. 712/15, 712/228
See application file for complete search history.

(56) References Cited

U.S. PATENT DOCUMENTS

| 5,892,962 | A | * | 4/1999 | Cloutier ........................ 712/16 |
| 6,145,072 | A | * | 11/2000 | Shams et al. ................... 712/22 |
| 6,438,737 | B1 | * | 8/2002 | Morelli et al. ................. 716/16 |
| 6,738,891 | B2 | * | 5/2004 | Fujii et al. ..................... 712/16 |
| 6,757,761 | B1 | * | 6/2004 | Smith et al. .................. 710/100 |
| 6,826,709 | B1 | * | 11/2004 | Clermidy et al. ............... 714/4 |
| 6,874,079 | B2 | * | 3/2005 | Hogenauer ................. 712/201 |
| 7,185,224 | B1 | * | 2/2007 | Fredenburg et al. ........... 714/10 |
| 7,320,064 | B2 | * | 1/2008 | Ramos et al. ................ 712/226 |
| 2004/0003206 | A1 | * | 1/2004 | May et al. .................... 712/218 |

FOREIGN PATENT DOCUMENTS

JP    2002-215382 A    8/2002

* cited by examiner

*Primary Examiner*—Eddie P Chan
*Assistant Examiner*—Jacob Petranek
(74) *Attorney, Agent, or Firm*—Canon U.S.A. Inc. I.P. Division

(57) ABSTRACT

A reconfigurable data processing device equipped with a plurality of data processing units controls timing of switching contents of data processing executed by each of the plurality of data processing units for each of a plurality of data processing operations.

8 Claims, 5 Drawing Sheets

RECONFIGURABLE DATA PROCESSING DEVICE AND METHOD

BACKGROUND OF THE INVENTION

1. Field of the Invention

The present invention relates to a reconfigurable data processing device and method.

2. Description of the Related Art

As a reconfigurable processing device capable of reconfiguration, there are a reconfigurable processing device called a field programmable gate array (FPGA), and a reconfigurable processing device having a processor type processing unit.

The FPGA includes processing units including a lookup table (LUT), an AND-OR logical element, and a small-size memory, and interconnects the processing units through a switch. The FPGA further includes a memory for configuration separately from the other memory. Configurations of an arithmetic element include an LUT, a logical element or the like, and a processing unit having a small-size memory, are defined in accordance with data stored in the memory for configuration. The FPGA defines a selection state of the switch to regulate a connection state of the processing units, thus defining an operation of the reconfigurable processing device.

The reconfigurable processing device having the processing type processing unit includes an arithmetic logical unit (ALU) in place of the LUT and the AND-OR logical element. The reconfigurable processing device having the processor type processing unit further includes a control unit configured to time-sequentially control the ALU and the small-size memory, and a program memory for defining time-sequential control.

According to such a reconfigurable processing device, contents of the memory used for configuration or the program memory are updated to reconfigure the reconfigurable processing device.

There is also a device which includes a plurality of memories for configuration, prestores different pieces of configuration information in the memories, and selects one of the pieces of configuration information to update a configuration.

For example, Japanese Patent Application Laid-Open No. 2002-215382 describes a technology which provides configuration memories corresponding to a plurality of configurations in order to reduce an overhead of configuration time, and connects the memories in a ring shape. This technology enables reuse of configuration data.

Thus, there is a technology which executes configuration of the reconfigurable processing device during its operation to expand an application range or improve effectiveness thereof.

This is a so-called "dynamic reconfiguration technology". In the dynamic reconfiguration, it is impossible to perform a desired operation during updating of the configuration, and accordingly, overall processing performance goes down.

In processing that has to be performed in real time, the updating of the configuration must be completed before data is supplied for processing. Therefore, time necessary for updating the configuration should be short.

Furthermore, in the dynamic configuration, data for configuration must be switched within a short time. Accordingly, a plurality of memory areas are required for configuration, and as a result, the bulk of hardware increases.

SUMMARY OF THE INVENTION

The present invention is directed to improving data processing efficiency. The present invention is also directed to shortening time necessary for changing an internal configuration of a data processing device.

According to an aspect of the present invention, a reconfigurable data processing device includes a plurality of data processing units; a switching unit configured to switch contents of data processing executed by the plurality of data processing units; and a timing control unit configured to control timing of switching the contents of the data processing by the switching unit for each of the plurality of data processing units.

According to another aspect of the present invention, a reconfigurable data processing device includes a plurality of data processing units; a connection unit configured to interconnect a data input unit, a data output unit, and the plurality of data processing units; a storage unit configured to store contents of a plurality of data processing operations executed by the plurality of data processing units and a plurality of connection states of the connection unit; a selection output unit configured to output contents of a data processing operation selected from the contents of data processing operations executed by the plurality of data processing units stored in the storage unit to the plurality of data processing units in order to switch the contents of the plurality of data processing operations executed by the plurality of data processing units, and to output a connection state selected from the plurality of connection states of the connection unit stored in the storage unit to the connection unit in order to switch connection states of the connection unit; and a control unit configured to control the selection output unit to switch the contents of the data processing output to the plurality of data processing units in timing in accordance with the plurality of data processing units.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EXEMPLARY EMBODIMENTS

An exemplary embodiment of the present invention will be described in detail below in accordance with the accompanying drawings. The exemplary embodiment will be described by taking an example of a reconfigurable processing device having a structure of a pipeline, complete parallel processing, and an n parallel pipeline.

Figure 1:
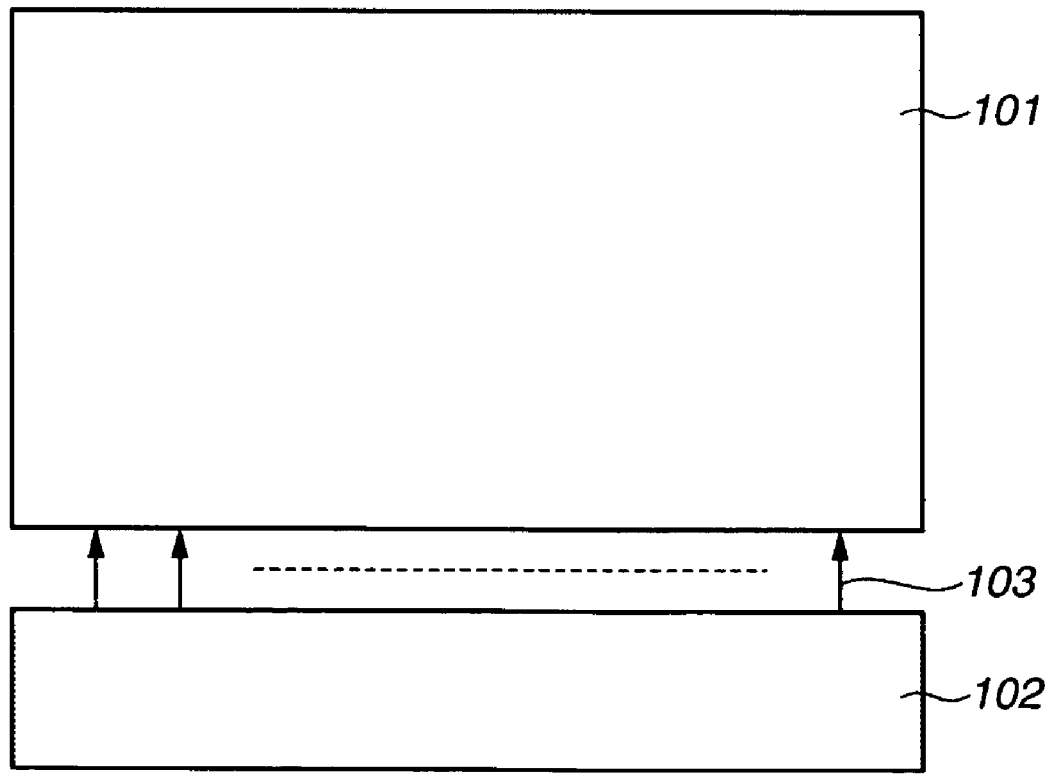
FIG. 1 is a diagram showing an arrangement of a reconfigurable processing device according to an exemplary embodiment.

FIG. 1 is a diagram showing an arrangement of a reconfigurable processing device according to the exemplary embodiment. As shown in FIG. 1, the reconfigurable processing device includes a data processing unit 101 and a configuration control unit 102. Configuration data 103 is supplied from the configuration control unit 102 to the data processing unit 101.

Figure 2:
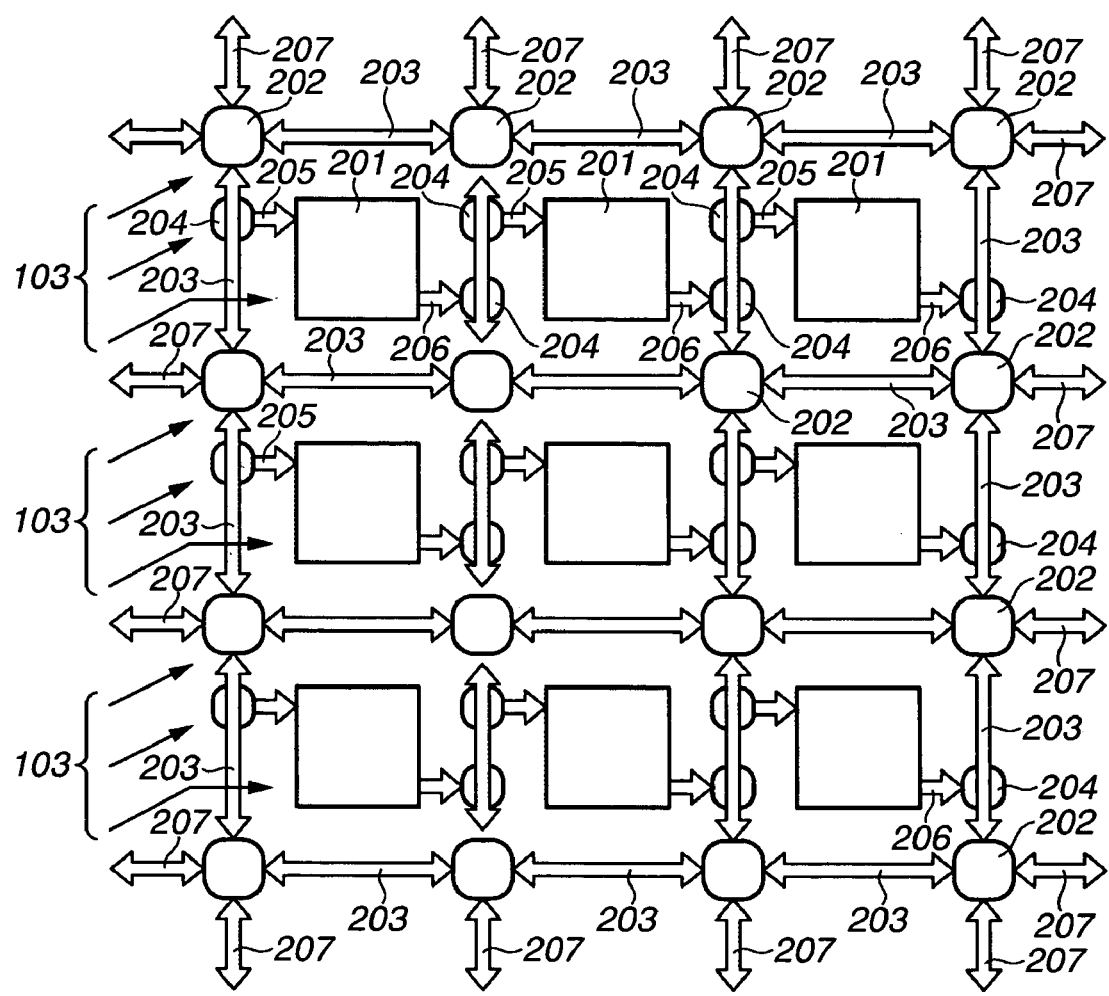
FIG. 2 is a diagram showing in detail an arrangement of a data processing unit in the reconfigurable data processing device.

FIG. 2 is a diagram showing in detail an arrangement of the data processing unit 101 in the reconfigurable processing device. In FIG. 2, a unit processing section 201 processes data supplied from a data input unit 205, and outputs the processed data from a data output unit 206. Each unit processing section 201 includes a selection/combination logical arithmetic module, an arithmetic element module, a memory module, or the like (not shown).

The data input unit 205 and the data output unit 206 are connected to a data transmission unit 203 through a first switch 204. The data transmission unit 203 is connected to another data transmission unit 203 through a second switch 202. A part of the second switch 202 is connected to an external data input/output unit 207.

In FIG. 2, while some parts are not shown, the configuration data 103 is supplied to all of the unit processing sections 201, and the first and second switches 204 and 202 in the data processing unit 101 of the reconfigurable processing device. A configuration and an operation of the unit processing sections 201, and connection destinations of the first and second switches 204 and 202 are defined in accordance with the configuration data 103 so that desired data processing can be realized.

Figure 3:
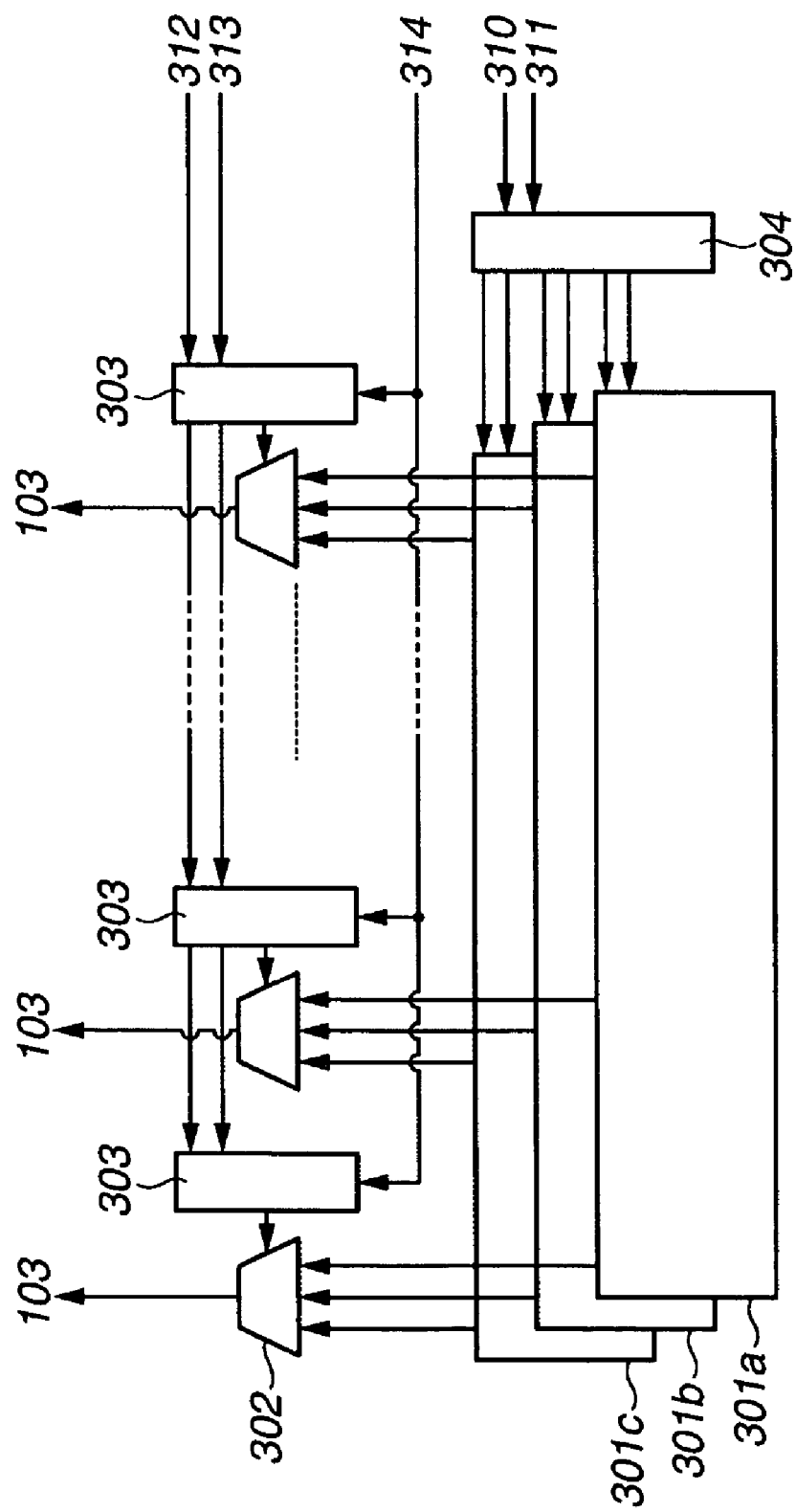
FIG. 3 is a diagram showing an arrangement of a configuration control unit of the reconfigurable processing device.

FIG. 3 is a diagram showing an arrangement of the configuration control unit 102 in the reconfigurable processing device. The configuration control unit 102 includes configuration data storage units 301a, 301b and 301c for storing contents of configuration. The exemplary embodiment employs an arrangement having three planes, a, b, and c. It will be appreciated that other arrangements may be used.

Each of the planes of the configuration data storage units 301a, 301b, and 301c stores configuration data 310 through a configuration data distribution unit 304 in accordance with configuration data input control data 311. In this case, the configuration data 301 is supplied from a configuration data input, and the configuration data input control data 311 is supplied from a configuration data input control input.

The configuration data storage units 301a, 301b, and 301c have an output for stored data corresponding to each storage element, and each stored data is output to a selector 302.

The selector 302 has inputs equal to or more than the number of planes of the configuration data storage units 301a, 301b, and 301c, and stored data outputs of the storage elements of the planes are input to a plurality of selectors 302.

Outputs from the plurality of selectors 302 are used as configuration data 103, and an output of one selector 302 is connected to one of the unit processing sections 201, and the first and second switches 204 and 202.

Configuration control unit 102 also includes a sequential selector control unit 303 which supplies selection control to the selector 302. The sequential selector control unit 303 further inputs configuration procedure data 312, input control data 313 of configuration procedure data, and a sequential trigger 314.

The number of sequential selector control units 303 and selectors 302 is equal to or more than those of unit processing sections 201, and first and second switches 204 and 202 (not shown in FIG. 3).

The sequential selector control unit 303 receives the configuration procedure data 312 in accordance with the input control data 313 of configuration procedure data. The configuration procedure data 312 is set in each sequential selector control unit 303.

According to the exemplary embodiment, the configuration procedure data 312 and the input control data 313 of configuration procedure data are supplied to another sequential selector control unit 303 through the sequential control unit 303.

The sequential selector control unit 303 is configured to control an output to the selector 302 in timing based on input of the sequential trigger 314 and in accordance with contents of the configuration procedure data 312.

At the selector 302, data stored in one of the planes of the configuration data storage units 301a, 301b, and 301c is selected as configuration data 103 based on a control signal output from the sequential selector control unit 303.

Data processing of the unit processing section 201, input/output to the reconfigurable processing device defined by the first and second switches 204 and 202, connection between the unit processing sections 201, and processing contents of the unit processing section 201 are defined in accordance with contents of the selected configuration data 103 so as to execute desired processing. It is to be noted that the configuration data 310, the input control data 311 of configuration data, the configuration procedure data 312, the input control data 313 of configuration procedure data, and the sequential trigger 314 are supplied from a central processing unit (CPU) or the like (not shown) which controls the reconfigurable processing device.

Now, a procedure is described which is carried out when nine unit processing sections 201 shown in FIG. 2 are subjected to configuration to take a form for executing 3-stage pipeline processing, and the configuration is changed from processing A to another processing B.

Configurations of the data transmission unit 203 and the first and second switches 204 and 202 are similar in procedure to that of the unit processing section 201, and detailed description thereof will not be repeated here.

Figure 4:
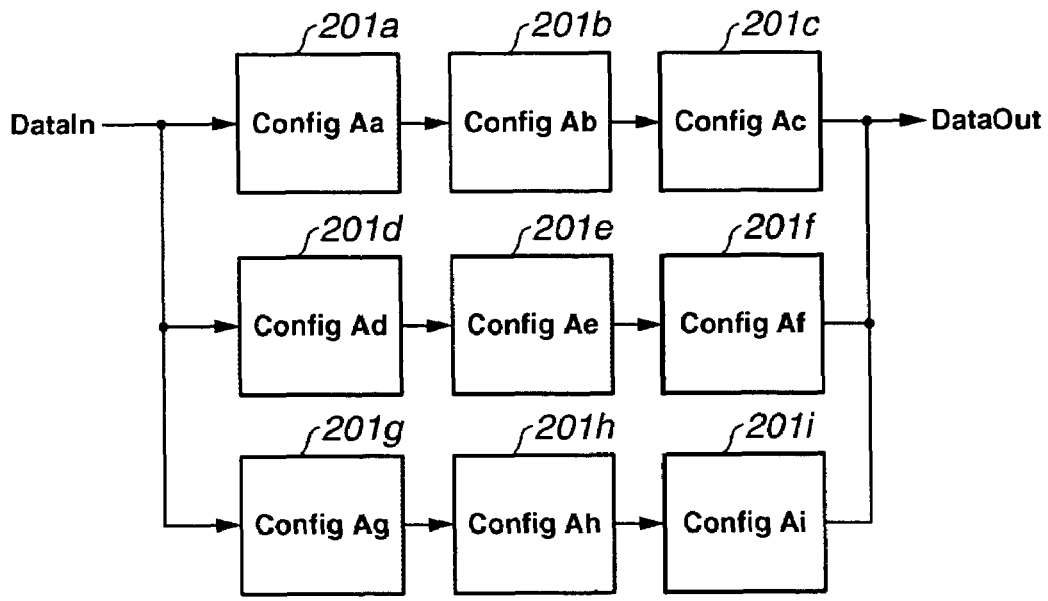
FIG. 4 is an explanatory diagram of a configuration procedure of a unit processing section.
Figure 5:
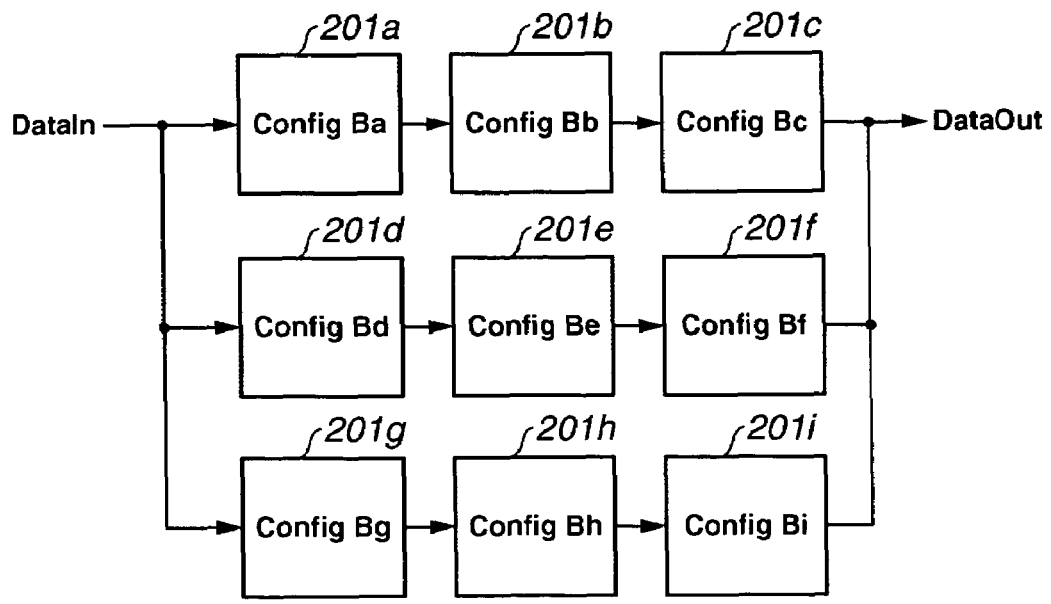
FIG. 5 is an explanatory diagram of a configuration procedure of the unit processing section.

FIGS. 4 and 5 are explanatory diagrams illustrating an exemplary configuration procedure of the unit processing section 201. Before execution of the processing operations A and B, the configuration data 310 is stored in the configuration data storage units 301a, 301b, and 301c through the configuration data distribution unit 304.

There are two kinds of processing operations in this configuration example. Accordingly, for example, it is only necessary to store configuration data for executing the processing A in the plane a, and configuration data for executing the processing B in the plane b.

It is assumed that in a first configuration state, nine unit processing sections 201a, 201b, ..., 201i are all set to execute the processing A, and configured to Config Aa, Config Ab, ..., Config Ai. As shown in FIGS. 4 and 5, the first and second switches 204 and 202 are configured to realize a data flow of a 3-stage pipeline configuration in which a pipeline stage includes three unit processing sections 201. In this case, the three unit processing sections 201 are (201a, 201d, and 201g), (201b, 201e, and 201h), and (201c, 201f, and 201i).

A configuration is set such that the external data input/output units 207 are an external data input DataIn and an external data output DataOut of FIGS. 4 and 5.

FIG. 5 shows a state in which a reconfiguration from the processing A to the processing B is finished. As shown in the drawing, a configuration of a switch for defining a data flow is similar to that of the processing A, and configurations of the unit processing sections 201a, 201b, . . . , 201i are set to Config Ba, Config Bb, . . . , Config Bi.

Figure 6:
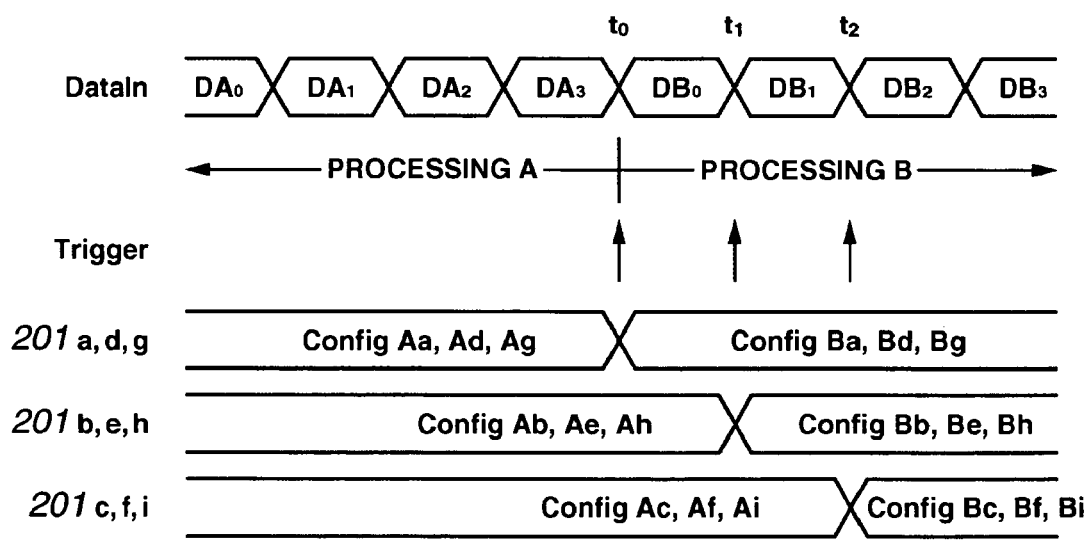
FIG. 6 is a diagram showing processing in an arrangement example of the embodiment. In the processing, data are continuously input to execute different processing operations A and B. A configuration is dynamically changed to execute desired processing of each data. That is, in the processing A, data DA0 to DA3 are processed, and in the processing B, data DB0 to DB3 are processed.

FIG. 6 is a diagram showing a manner in which data are continuously input to execute the different processing operations A and B, and a configuration is dynamically changed to execute desired processing for each data in a configuration example of the exemplary embodiment. In this case, the processing A is executed with respect to data DA0 to DA3, and the processing B is executed with respect to data DB0 to DB3.

In the example shown in FIG. 6, the processing A and the processing B are realized at three pipeline stages using three unit processing sections per pipeline stage. Thus, the process is carried out by three processing units and at three cycles in accordance with timing at which data input from the processing A to the processing B is changed.

That is, at a time to, when processing data input to the DataIn is changed from A($DA_3$) to B($DB_0$), configurations of the unit processing sections 201a, 201d, and 201g are changed from A to B. Next, at a time $t_1$ (1 cycle after time $t_0$) when data input to the DataIn is changed from $DB_0$ to $DB_1$, configurations of the unit processing sections 201b, 201e, and 201h are changed from A to B. At a time $t_2$ (1 cycle after time $t_1$) when data input to the DataIn is changed from $DB_1$ to $DB_2$, configurations of the unit processing sections 201c, 201f, and 201i are changed from A to B so as to finish configuration.

According to the exemplary embodiment, in order to execute the aforementioned configuration, the sequential selector controller 303 controls the selector 302 based on the data input to the DataIn and the configuration trigger 314. Then, configuration data 103 is selected from each of the planes (plane a or b in this example) of the configuration data storage units 301a, 301b, and 301c. Configuration data 103 is supplied to the unit processing section 201, and the first and second switches 204 and 202

Before execution of the processing A and the processing B, configuration procedure data 312 is input and set in the sequential selector control unit 303 in accordance with the input control data 313 of configuration procedure data. The sequential selector control unit 303 controls the selector 302.

In order to realize the aforementioned configuration, the configuration of the processing A is stored in the configuration data storage unit 301a (plane a). The configuration of the processing B is stored in the configuration data storage unit 301b (plane b). Then, the sequential selector control unit 303 controls the selector 302 to select a plane as described below, so that configuration changing order is set as described above.

When configuration data 103 is set for the unit processing sections 201a, 201d, and 201g, the selector 302 is controlled to select the plane b at the time $t_0$, the plane b at the time $t_1$, and the plane b at the time $t_2$.

When configuration data 103 is set for the unit processing sections 201b, 201e, and 201h, the selector 302 is controlled to select the plane a at the time $t_0$, the plane b at the time $t_1$, and the plane b at the time $t_2$.

When configuration data 103 is set for the unit processing sections 201c, 201f, and 201i, the selector 302 is controlled to select the plane a at the time $t_0$, the plane a at the time $t_1$, and the plane b at the time $t_2$.

As described above, according to the exemplary embodiment, in the reconfigurable data processing, the reconfiguration procedure can be applied to configuration when a plurality of different processing operations are sequentially executed. As a result, it is possible to reduce operation stop time of required processing which accompanies reconfiguration.

Even when a plurality of different processing operations are mixed during dynamic reconfiguration, no configuration memory is needed to define a configuration state at the time of the mixture. Thus, the configuration memories can be reduced.

The present invention may be applied to a system having a plurality of devices (e.g., host computer, interface device, reader, and printer), or a device having one piece of equipment (e.g., copying machine, or a facsimile machine).

The present invention can be also achieved by supplying a recording medium that records program code (software) configured to realize the functions of the exemplary embodiment to a system or a device, and by causing a computer (CPU or micro-processing unit (MPU)) of the system or the device to read and execute the program code stored in the recording medium.

In this case, the program code read from the recording medium realizes the functions of the exemplary embodiment as described above.

As the recording medium for supplying the program code, for example, a floppy disk, a hard disk, an optical disk, a magneto-optical disk, a compact disk—read-only memory (CD-ROM), a CD—recordable (CD-R), a magnetic tape, a nonvolatile memory card, or a ROM can be used.

The present invention is not limited to the form in which the functions of the exemplary embodiment are realized by the computer that executes program code it reads. In other words, the invention includes a case where an operating system (OS) or the like operated on the computer executes a part or all of processing based on instructions of the program code so as to realize the functions of the exemplary embodiment.

The present invention further includes a case where the program code read from the recording medium is written in a memory disposed in a function expansion board inserted into the computer or a function expansion unit connected to the computer, and then a CPU or the like provided in the function expansion board or the function expansion unit executes a part or all of the processing based on instructions of the program code so as to realize the functions of the exemplary embodiment.

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2005-051370 filed Feb. 25, 2005, which is hereby incorporated by reference herein in its entirety.

What is claimed is:

1. A reconfigurable data processing device comprising:
   first and second switches;
   a data transmission unit;
   first and second data processing units, a data output unit of the first data processing unit being connected to the data transmission unit via the first switch and a data input unit of the second data processing unit being connected to the data transmission unit via the second switch;

a storage unit configured to store first configuration data for configuring the first and second data processing units such that the first and second data processing units perform a first data processing operation, and second configuration data for configuring the first and second data processing units such that the first and second data processing units perform a second data processing operation;

a switching unit configured to switch contents of data processing executed by the first and second data processing units in accordance with the second configuration data; and a timing control unit configured to control timing of switching the contents of the data processing by the switching unit for the first and second data processing units such that the content of data processing executed by the first data processing unit is switched from the first data processing operation according to the first configuration data to the second data processing operation according to the second configuration data at a first timing according to an input of first data to the first data processing unit for performing the second data processing operation and such that the content of data processing executed by the second data processing unit is switched from the first data processing operation according to the first configuration data to the second data processing operation according to the second configuration data at a second timing according to an input of second data to the first data processing unit for performing the second data processing operation, wherein the first data processing unit executes the second data processing operation on the first data and the second data processing unit simultaneously executes the first data processing operation on data on which the first data processing operation has been executed by the first data processing unit in a time period between the first timing and the second timing, where the time period between the first and second timings occurs in a single clock cycle, and wherein the first data processing unit executes the second data processing operation on the second data and the second data processing unit executes the second data processing operation on the first data on which the second data processing operation has been executed by the first data processing unit after the second timing.

2. The reconfigurable data processing device according to claim 1, wherein the switching unit is configured to switch a connection state of the first and second switches.

3. A reconfiguring method in a reconfigurable data processing device equipped with first and second switches, a data transmission unit, first and second data processing units, and a storage unit configured to store first configuration data for a first data processing operation and second configuration data for a second data processing operation, a data output unit of the first data processing unit being connected to the data transmission unit via the first switch and a data input unit of the second data processing unit being connected to the data transmission unit via the second switch, the reconfiguring method comprising:

a switching step of switching contents of data processing executed by the first and second data processing units in accordance with the second configuration data; and a timing control step of controlling timing of switching the contents of the data processing in the switching step for the first and second data processing units such that the content of data processing executed by the first data processing unit is switched from the first data processing operation according to the first configuration data to the second data processing operation according to the second configuration data at a first timing according to an input of first data to the first data processing unit for performing the second data processing operation and such that the content of data processing executed by the second data processing unit is switched from the first data processing operation according to the first configuration data to the second data processing operation according to the second configuration data at a second timing according to an input of second data to the first data processing unit for performing the second data processing operation, wherein the first data processing unit executes the second data processing operation on the first data and the second data processing unit simultaneously executes the first data processing operation on data on which the first data processing operation has been executed by the first data processing unit in a time period between the first timing and the second timing, where the time period between the first and second timings occurs in a single clock cycle, and wherein the first data processing unit executes the second data processing operation on the second data, and the second data processing unit executes the second data processing operation on the first data on which the second data processing operation has been executed by the first data processing unit after the second timing.

4. The reconfiguring method according to claim 3, wherein the switching step includes a step of switching a connection state of the first and second switches.

5. A computer-readable medium which stores a program comprising computer-executable instructions for causing a computer to execute the reconfiguring method of claim 3.

6. A reconfigurable data processing device comprising:

a data transmission unit;

first and second data processing units;

a first connection unit configured to connect a data output unit of the first data processing unit to the data transmission unit;

a second connection unit configured to connect a data input unit of the second data processing unit to the data transmission unit;

a storage unit configured to store first data processing operations to be executed by the first and second data processing units, second data processing operations to be executed by the first and second data processing units, and a plurality of connection states of the first and second connection units;

a selection output unit configured to output one of the first and second data processing operations stored in the storage unit to the first and second data processing units in order to switch the data processing operations executed by the first and second data processing units, and to output a connection state selected from the plurality of connection states of the first and second connection units stored in the storage unit to the first and second connection units in order to switch connection states of the first and second connection units; and a control unit configured to control the selection output unit to switch the data processing operations output to the first and second data processing units such that the data processing operation executed by the first data processing unit is switched from the first data processing operation to the second data processing operation at a first timing according to an input of first data to the first data processing unit for performing the second data processing operation and such that the data processing operation executed by the second data processing unit is switched from the first data processing operation to the second data processing operation at a second timing according to an input of second data to the first data processing unit for performing the second data processing operation, wherein the first data processing unit executes the second data processing operation on the first data, and the second data processing unit simultaneously executes the first data processing operation on data on which the first data processing operation has been executed by the first data processing unit in a time period between the first timing and the second timing, where the time period between the first and second timings occurs in a single clock cycle, and wherein the first data processing unit executes the second data processing operation on the second data, and the second data processing unit executes the second data processing operation on the first data on which the second data processing operation has been executed by the first data processing unit after the second timing.

7. A reconfiguring method in a reconfigurable data processing device equipped with a data transmission unit and first and second data processing units, the reconfiguring method comprising:

a first connection step of connecting a data output unit of the first data processing unit to the data transmission unit via a first connection unit;

a second connection step of connecting a data input unit of the second data processing unit to the data transmission unit via a second connection unit;

a reading step of reading out first data processing operations to be executed by the first and second data processing units, second data processing operations to be executed by the first and second data processing units, and a plurality of connection states of the first and second connection units;

an output step of outputting one of the first and second data processing operations read out in the reading step to the first and second data processing units in order to switch the data processing operations executed by the first and second data processing units;

a connection state output step of outputting a connection state selected from the plurality of connection states to the connection unit in order to switch connection states of the first and second connection units; and a switching step of switching the data processing operation output to the first and second data processing units such that the data processing operation executed by the first data processing unit is switched from the first data processing operation to the second data processing operation at a first timing according to an input of first data to the first data processing unit for performing the second data processing operation and such that the data processing operation executed by the second data processing unit is switched from the first data processing operation to the second data processing operation at a second timing according to an input of second data to the first data processing unit for performing the second data processing operation, wherein the first data processing unit executes the second data processing operation on the first data, and the second data processing unit simultaneously executes the first data processing operation on data on which the first data processing operation has been executed by the first data processing unit in a time period between the first timing and the second timing, where the time period between the first and second timings occurs in a single clock cycle, and wherein the first data processing unit executes the second data processing operation on the second data, and the second data processing unit executes the second data processing operation on the first data on which the second data processing operation has been executed by the first data processing unit after the second timing.

8. A computer-readable medium which stores a program comprising computer-executable instructions for causing a computer to execute the reconfiguring method of claim 7.

* * * * *